United States Patent
Imamura et al.

(10) Patent No.: US 7,253,853 B2
(45) Date of Patent: Aug. 7, 2007

(54) LIQUID CRYSTAL DISPLAY AND LIGHTING UNIT HAVING PARABOLIC SURFACE

(75) Inventors: Norihiro Imamura, Kyoto (JP); Minori Koshio, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/309,220

(22) Filed: Dec. 4, 2002

(65) Prior Publication Data
US 2003/0165067 A1    Sep. 4, 2003

(30) Foreign Application Priority Data
Dec. 4, 2001 (JP) ............. 2001-370576
Dec. 4, 2001 (JP) ............. 2001-370577

(51) Int. Cl.
*G02F 1/1335* (2006.01)
*F21V 7/04* (2006.01)

(52) U.S. Cl. .............. 349/63; 362/603; 362/606; 362/626; 362/628

(58) Field of Classification Search ............ 349/63, 349/64, 65; 362/26, 31, 603, 606, 623, 625, 362/626, 628; 385/146, 901
See application file for complete search history.

(56) References Cited

U.S. PATENT DOCUMENTS

| | | | | |
|---|---|---|---|---|
| 5,860,722 A | * | 1/1999 | Tai et al. ............ | 362/603 |
| 6,204,898 B1 | * | 3/2001 | Maeda ............. | 349/63 |
| 6,286,970 B1 | * | 9/2001 | Egawa et al. ........ | 362/31 |
| 6,295,104 B1 | * | 9/2001 | Egawa et al. ........ | 349/63 |
| 6,347,874 B1 | * | 2/2002 | Boyd et al. ......... | 362/31 |
| 6,494,585 B1 | * | 12/2002 | Wada ............... | 362/26 |
| 6,561,660 B2 | * | 5/2003 | Huang .............. | 362/27 |
| 6,607,279 B2 | * | 8/2003 | Niida et al. ......... | 362/26 |
| 6,644,823 B2 | * | 11/2003 | Egawa et al. ........ | 362/31 |

FOREIGN PATENT DOCUMENTS

JP     2000-200049      7/2000

OTHER PUBLICATIONS

English Language Abstract of JP-A-2000-200049.

* cited by examiner

*Primary Examiner*—Andrew Schechter
*Assistant Examiner*—Michael H. Caley
(74) *Attorney, Agent, or Firm*—Michael Bednarek; Paul, Hastings, Janofsky & Walker LLP

(57) ABSTRACT

A lighting unit is incorporated in an LC display. The lighting unit includes a light guide and a light source adjacent to the light guide. The light guide includes a rear surface facing an LC panel, a front surface opposite to the rear surface, a first side surface between the rear and the front surfaces, and a second side surface spaced widthwise from the first side surface. The light from the light source travels into the light guide, and from the first toward the second side surfaces. A reflector for reflecting the light incident on the second side surface toward the first side surface is formed on the second side surface. The front surface of the light guide is formed with first and second slant portions. Each first slant portion reflects the light, traveling from the first toward the second side surfaces, toward the rear surface of the light guide. Each second slant portion reflects the light, traveling from the second toward the first side surfaces, toward the rear surface of the light guide.

11 Claims, 7 Drawing Sheets

LIQUID CRYSTAL DISPLAY AND LIGHTING UNIT HAVING PARABOLIC SURFACE

BACKGROUND OF THE INVENTION

1. Field of the Invention

The present invention relates to a liquid crystal display, and more particularly to a lighting unit used in a liquid crystal display.

2. Description of the Related Art

Generally, a liquid crystal display used in a notebook-size computer for example includes a liquid crystal panel and a lighting unit for illuminating the panel. Conventionally with respect to the lighting unit, various efforts have been made to achieve as uniform illumination of the liquid crystal display as possible. For example, JP-A2000-200049 discloses two kinds of lighting units described below.

A first lighting unit B1, as shown in FIG. 7A of the present application, includes a light source 80 and a light guiding plate 9A. Light emitted from the light source 80 enters into the light guiding plate 9A via a first side surface 90a and travels toward a second side surface 90b. The light guiding plate 9A has a front surface formed with a plurality of slant portions 91A. The light traveling from the first side surface 90a toward the second side surface 90b is reflected by the slant portions 91A to be emitted toward a panel P via a rear surface 92 of the light guiding plate 9A.

A second lighting unit B2, as shown in FIG. 7B of the present application, includes a light source 80, a light guiding plate 9B and a reflector 89. Light emitted from the light source 80 enters into the light guiding plate 9B via the first side surface 90a to meet the second side surface 90b. The light is subsequently reflected by the reflector 89 and travels toward the first side surface 90a. Like the first lighting unit B1 described above, the light guiding plate 9B has a front surface formed with a plurality of slant portions 91B. The light, reflected by the reflector 89 and subsequently traveling toward the first side surface 90a, is reflected by the slant portions 91B to be emitted toward the panel P via the rear surface 92 of the light guiding plate 9B.

As above described, the lighting unit B1 and the lighting unit B2 are respectively provided with a plurality of highly reflective slant portions formed on the front surface of the light guiding plate. The slant portions are provided in order to illuminate the liquid crystal panel P with light emitted from the light source 80 as uniformly as possible. However, such a conventional arrangement does not always achieve sufficiently evenly distributed light.

As explained with reference to FIG. 7A, in the lighting unit B1, light traveling from the first side surface 90a toward the second side surface 90b is reflected by the slant portions 91A and subsequently emitted from the rear surface 92 of the light guiding plate 9A. With this arrangement, light tends to be emitted in large amount around the first side surface 90a facing the light source 80, whereas light tends to be emitted in small amount around the second side surface 90b positioned far from the light source 80. As a result, it is difficult to uniformly illuminate the whole surface of the panel P. Further, in the lighting unit B1, part of the light entering into the light guiding plate 9A leaks via the second side surface 90b. This also obstructs the achievement of uniform illumination of the panel P.

On the other hand, the lighting unit B2 shown in FIG. 7B is provided with the reflector 89 positioned opposite to the light source 80 across the light guide 9B. Therefore, there is no possibility of leakage of light via the second side surface 90b of the light guide. However, light output from the rear surface of the light guiding plate 9B is also different by location in the lighting unit B2. Specifically, light tends to be emitted in large amount around the second side surface 90b, whereas light tends to be emitted in small amount around the first side surface 90a.

SUMMARY OF THE INVENTION

The present invention has been proposed under the circumstances described above. It is, therefore, an object of the present invention to provide a lighting unit capable of illuminating a region to be illuminated more evenly than conventionally possible.

According to the present invention, there is provided a lighting unit comprising: a light guide including a rear surface facing an object to be illuminated, a front surface opposite to the rear surface, a first side surface extending between the rear surface and the front surface, and a second side surface spaced from the first side surface in a width direction; a light source adjacent to the light guide for supplying light to be directed from the first side surface toward the second side surface; and a reflector for reflecting light incident on the second side surface toward the first side surface. The front surface of the light guide is formed with a first slant portion and a second slant portion, the first slant portion reflecting the light, traveling from the first side surface toward the second side surface, toward the rear surface of the light guide, the second slant portion reflecting the light, traveling from the second side surface toward the first side surface, toward the rear surface of the light guide.

Preferably, the reflector covers the second side surface.

Preferably, the first slant portion and the second slant portion may be spaced from each other in the above-mentioned width direction and held non-parallel to each other.

Preferably, the front surface of the light guide may be formed with a flat portion extending between the first slant portion and the second slant portion, the flat portion being parallel to the rear surface of the light guide.

Preferably, the front surface of the light guide may be formed with a third slant portion for reflecting light, traveling from the first side surface toward the second side surface, toward the rear surface of the light guide. The third slant portion is positioned closer to the second side surface than the first slant portion is, the third slant portion having a greater height than the first slant portion.

Preferably, the light guide may comprise a third side surface extending between the first side surface and the second side surface, the light source facing the third side surface.

Preferably, the first side surface may be convex away from the second side surface. The light emitted from the light source is reflected by the first side surface toward the second side surface.

Preferably, the first side surface may be parabolic.

Preferably, the light guide may comprise an auxiliary light guiding member facing the light source, a main light guiding member separate from the auxiliary light guiding member, the first side surface being provided on the auxiliary light guiding member, the second side surface being provided on the main light guiding member.

Preferably, the auxiliary light guiding member may comprise a light outlet surface for emitting light reflected by the first side surface, and the main light guiding member may comprise a light incidence surface facing the light outlet surface. Preferably, the light outlet surface may be convex toward the light incidence surface.

Preferably, the first side surface may be formed with a plurality of recesses for reflecting light emitted from the light source toward the second side surface, each recess including a pair of slant portions non-parallel to each other, and a flat portion extending between the slant portions. Preferably, the flat portion may be parallel to the second side surface.

Other features and advantages of the present invention will become apparent from the detailed description given below with reference to the accompanying drawings.

DETAILED DESCRIPTION OF THE PREFERRED EMBODIMENT

Preferred embodiments of the present invention will be described below in detail with reference to the accompanying drawings.

Figure 1:
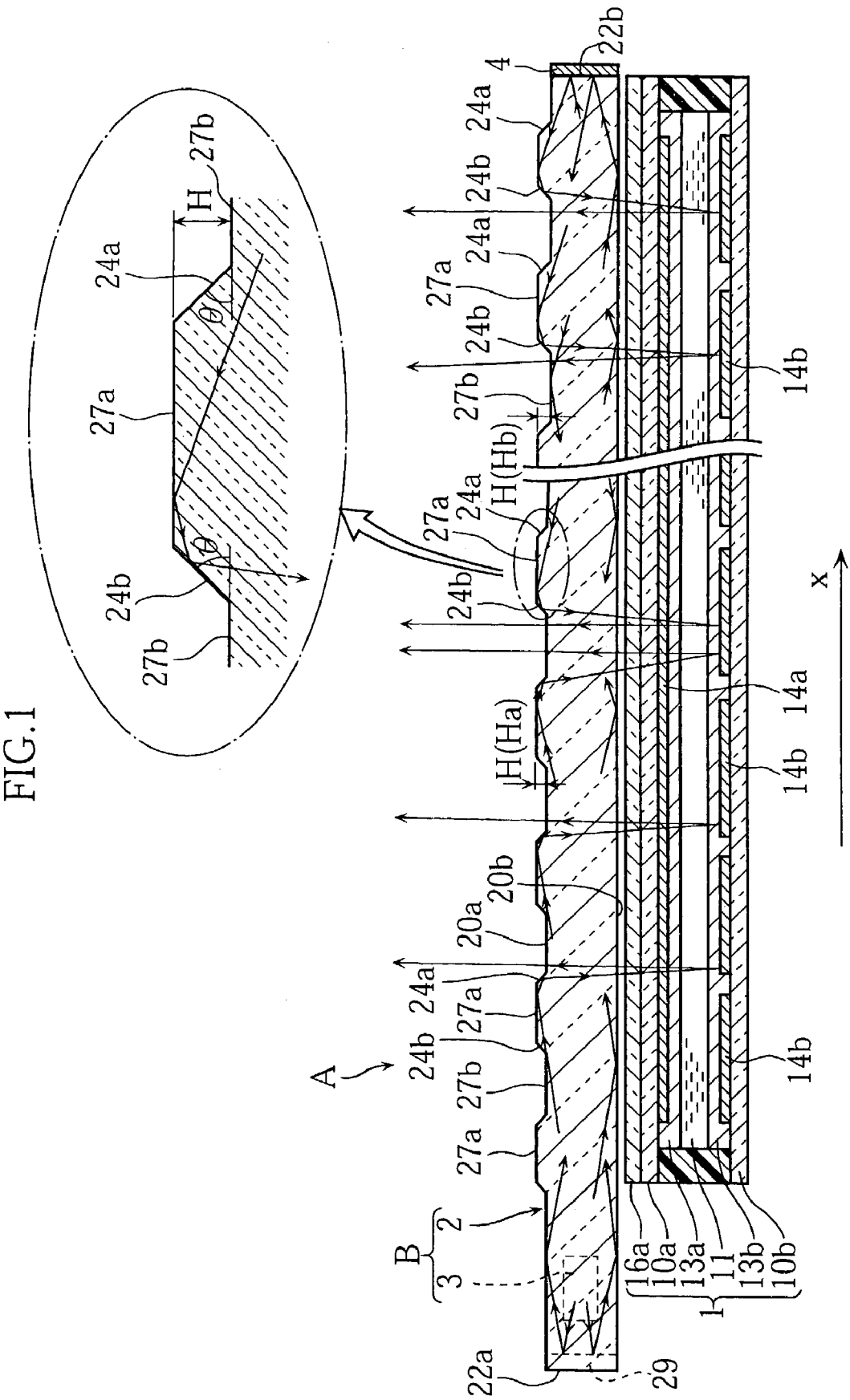
FIG. 1 is a sectional view showing an arrangement of a liquid crystal display provided with a lighting unit according to a first embodiment of the present invention.
Figure 2:
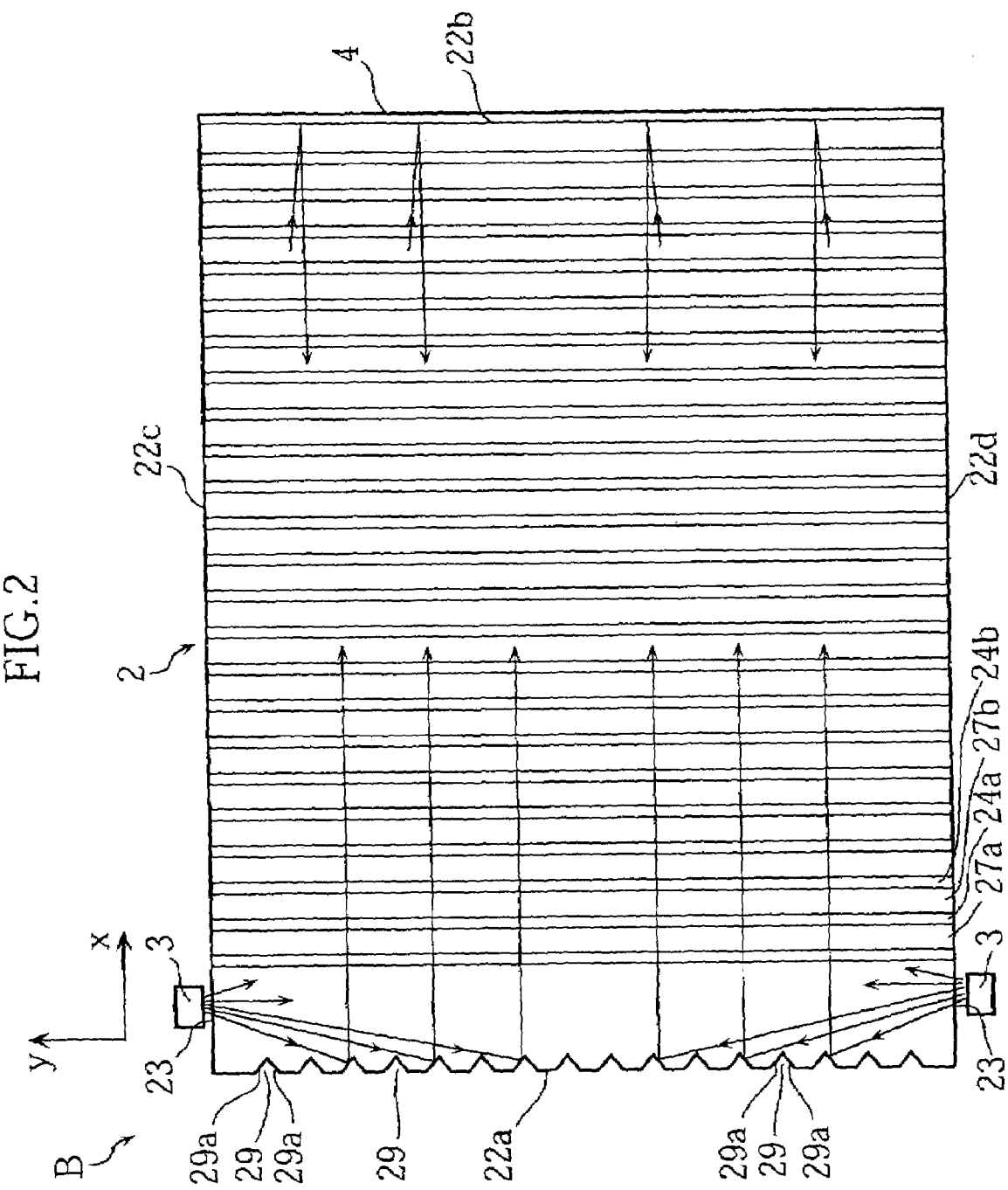
FIG. 2 a plan view illustrating the lighting unit shown in FIG. 1.

FIG. 1 illustrates in section a liquid crystal display A provided with a lighting unit B in accordance with a first embodiment of the present invention, and FIG. 2 is a plan view illustrating the lighting unit B. The illustrated liquid crystal display A is of reflection type for front lighting. There is provided a liquid crystal panel 1 at the back of the lighting unit B.

As shown in FIG. 2, the lighting unit B comprises a light guiding plate 2 formed into a rectangle and two light sources 3. The light guiding plate 2 is made of highly transparent synthetic resin and has a front surface 20a and a rear surface 20b that are spaced from each other in the thickness direction (see FIG. 1). Further, the light guiding plate 2 has a first side surface 22a and a second side surface 22b that are spaced apart from each other in a direction x, and a third side surface 22c and a fourth side surface 22d that are spaced apart from each other in a direction y.

The third side surface 22c and the fourth side surface 22d respectively have a light incidence portion 23 facing the light source 3. Each light incidence portion 23 is positioned adjacent to the first side surface 22a. The light source 3 includes a light emitting diode (LED) for example. Light emitted from the light source 3 enters into the light guiding plate 2 via the light incidence portion 23.

The first side surface 22a is formed with a plurality of recesses 29 appropriately spaced apart from each other in the direction y. Each recess 29 has a pair of V-shaped wall surfaces 29a. The wall surfaces 29a reflect light emitted from the light sources 3 in the direction x. The first side surface 22a is flat except the portion formed with the recesses 29.

The second side surface 22b is flat and covered with highly reflective reflecting layer 4. Light traveling in the light guiding plate 2 in the direction x is reflected by the reflecting layer 4 to be directed in the opposite direction. The reflecting layer 4 is formed by vapor deposition of aluminum or application of white paint. Alternatively, a plate made of metal or synthetic resin may be fixed to the second side surface 22b.

As shown in FIG. 1, the front surface 20a of the light guiding plate 2 is formed with a plurality of protrusions (having a trapezoidal cross section). Each protrusion has first and second slant surfaces 24a and 24b, and a flat portion 27a extending between these slant portions. The adjacent protrusions have a flat region 27b between them. The flat portion 27a, the flat region 27b, and the rear surface 20b are parallel to each other. The slant surfaces 24a~24b, the flat portion 27a, and the flat region 27b extend in the direction y (see FIG. 2). The first slant surface 24a reflects the light traveling rightward in the light guiding plate 2 toward the rear surface 20b, while the second slant surface 24b reflects the light traveling leftward in the light guiding plate 2 toward the rear surface 20b. The slant surfaces 24a and 24b are inclined to the flat region 27b at an angle • which is 45° for example.

Each of the protrusions has a predetermined height H, though the heights of the respective protrusions may not be necessarily the same. In the example shown in FIG. 1, the protrusions increase progressively in height as they are positioned closer to the second side surface 22b of the light guiding plate 2 (Hb>Ha). More precisely, the protrusions relatively close to the side surface 22b are "not lower" than those relatively far from the side surface 22b. This means that more than two adjacent protrusions may have the same height. For illustration, the description will be given for the case where six protrusions are formed on the light guiding plate 2. The protrusion which is closest to the side surface 22a is hereinafter called a first protrusion, and the second closest is called a second protrusion. In the same manner, the remaining four protrusions are respectively called third, fourth, fifth and sixth protrusions (the sixth protrusion is closest to the side surface 22b). The six protrusions are divided into three groups for example. It is supposed that only the first protrusion belongs to the first group, the second~third protrusions belonging to the second group, and the fourth~sixth protrusions belonging to the third group. In each group, the protrusions have the same height. Where the height of the protrusions of the first group is $H_1$, that of the second group is $H_2$ and that of the third group is $H_3$, according to the present embodiment, these height are set so that a relation $H_1<H_2<H_3$ is satisfied.

In the embodiment shown in FIG. 1, the average of the heights H of the protrusions is about 5•m for example. The pitch between the first slant surfaces 24a is about 250•m for example, and the second slant surfaces 24b also have a pitch of about 250•m. Preferably, the pitches are the same as a pixel pitch of the liquid crystal panel 1. The pitches set as above described can reduce generation of interference fringes on the liquid crystal panel 1.

The liquid crystal panel 1 has a conventionally known structure. The liquid crystal panel 1 includes a pair of glass or resin substrates 10a, 10b and a liquid crystal 11 sealed between them. The paired substrates 10a and 10b are internally provided with a plurality of electrodes 14a, 14b and alignment layers 13a, 13b. A polarizer 16a is provided in front of the substrate 10a. Simple matrix driving method (passive driving method) is employed as a driving method. The electrodes 14a are horizontal electrodes (scanning electrodes) that extend laterally in the figure and are evenly spaced in the direction perpendicular to the plane of paper. The other electrodes 14b are vertical electrodes (signal electrodes) that extend in the direction perpendicular to the plane of paper and are evenly spaced parallel in the lateral direction of the figure. In the liquid crystal 11, a voltage is applied to a point where one scanning electrode 14a and one signal electrode 14b cross each other. The point is defined as a pixel. As a driving method of the liquid crystal panel, an active driving method may be employed.

The substrate 10a is transparent, and the electrode 14a is a transparent electrode made of ITO film. On the other hand, the electrode 14b is a reflective electrode made of metal capable of reflecting light. In the liquid crystal panel 1, light traveling from the front side of the panel to the liquid crystal panel 1 passes through the polarizer 16a, the substrate 10a and the liquid crystal 11, and subsequently is reflected by the electrodes 14b toward the front side of the liquid crystal panel 1. Instead of the reflective electrodes, a reflector may be provided on the rear surface of the liquid crystal panel 1.

Next, description will be given to operation of the liquid crystal display A.

Referring to FIG. 2, the light emitted from each light source 3 enters into the light guiding plate 2 via the light incidence portion 23 to meet the first side surface 22a. After reflected by the first side surface 22a, the light is totally reflected repeatedly by the rear surface 20b and the flat portions 27a, 27b, traveling toward the second side surface 22b. At this time, the light incident on the first slant surface 24a is reflected toward the rear surface 20b. When an angle of incidence to the rear surface 20b is smaller than a critical angle of total reflection, the light is emitted from the rear surface 20b to irradiate the liquid crystal panel 1.

On the other hand, the light which is not incident the first slant surface 24a meets the second side surface 22b of the light guiding plate 2, and is reflected by the reflecting layer 4. The light is reflected again and again by the rear surface 20b and the flat portions 27a, 27b, traveling to the first side surface 22a. At this time, the light incident on the second slant surface 24b is reflected so as to meet the rear surface 20b at a small angle of incidence, to be emitted to the liquid crystal panel 1 from the rear surface 20b. The light irradiated on the liquid crystal panel 1 is reflected toward the front side of the liquid crystal panel 1 by the electrodes 14b, and penetrates the light guiding plate 2 in the thickness direction.

In the above-described embodiment, both of the light traveling from the first side surface 22a toward the second side surface 22b and the light traveling from the second side surface 22b toward the first side surface 22a can be reflected toward the rear surface 20b of the light guiding plate 2. Consequently, the liquid crystal panel can be illuminated more evenly than is conventionally possible.

As coming closer to the second side surface 22b, light traveling from the first side surface 22a toward the second side surface 22b becomes weak (the amount of light per unit area is reduced). In view of this, the first slant surfaces 24a have the greater heights H (that is, they have the greater area for receiving light) as positioned closer to the second side surface 22b in the above-described embodiment. Thus, the first slant surfaces 24a positioned relatively far from the light source 3 can reflect a sufficient amount of light toward the rear surface 20b. This arrangement also contributes to uniform emission of light from the rear surface 20b.

Figure 3:
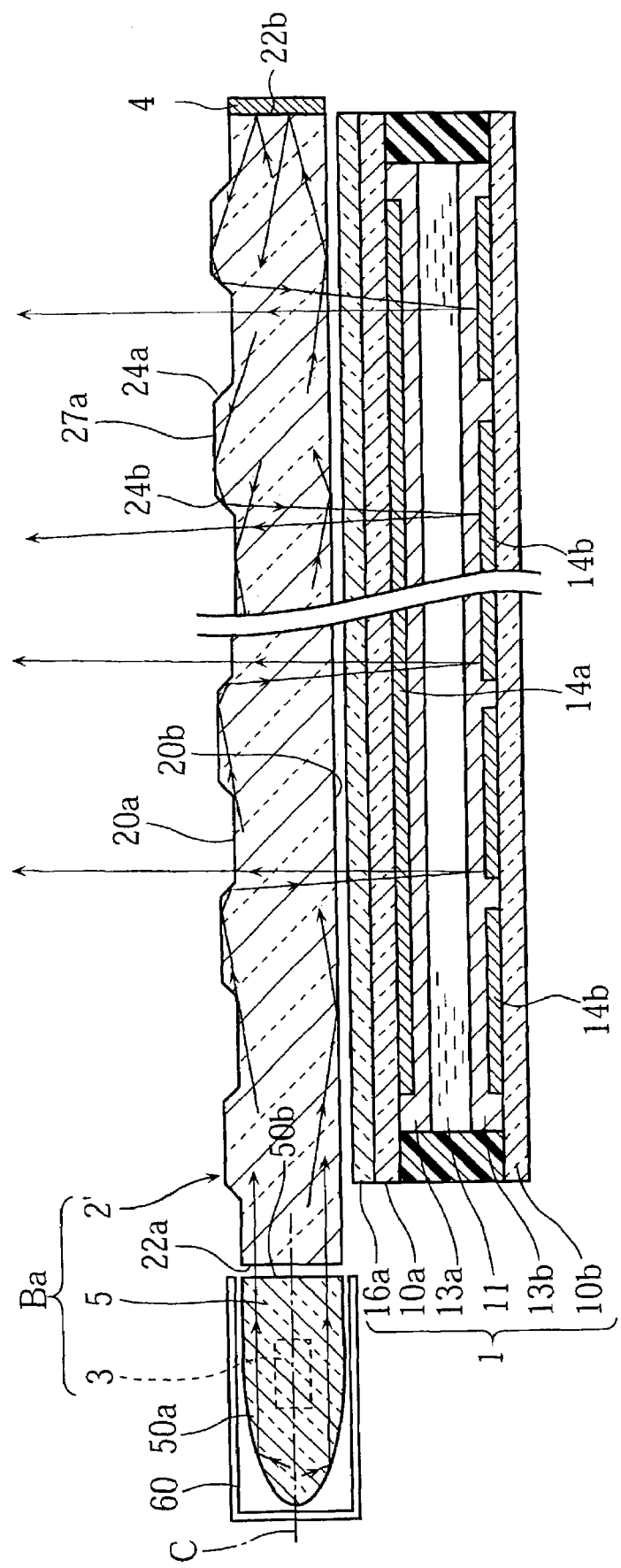
FIG. 3 is a sectional view showing an arrangement of a liquid crystal display provided with a lighting unit according to a second embodiment of the present invention.
Figure 4:
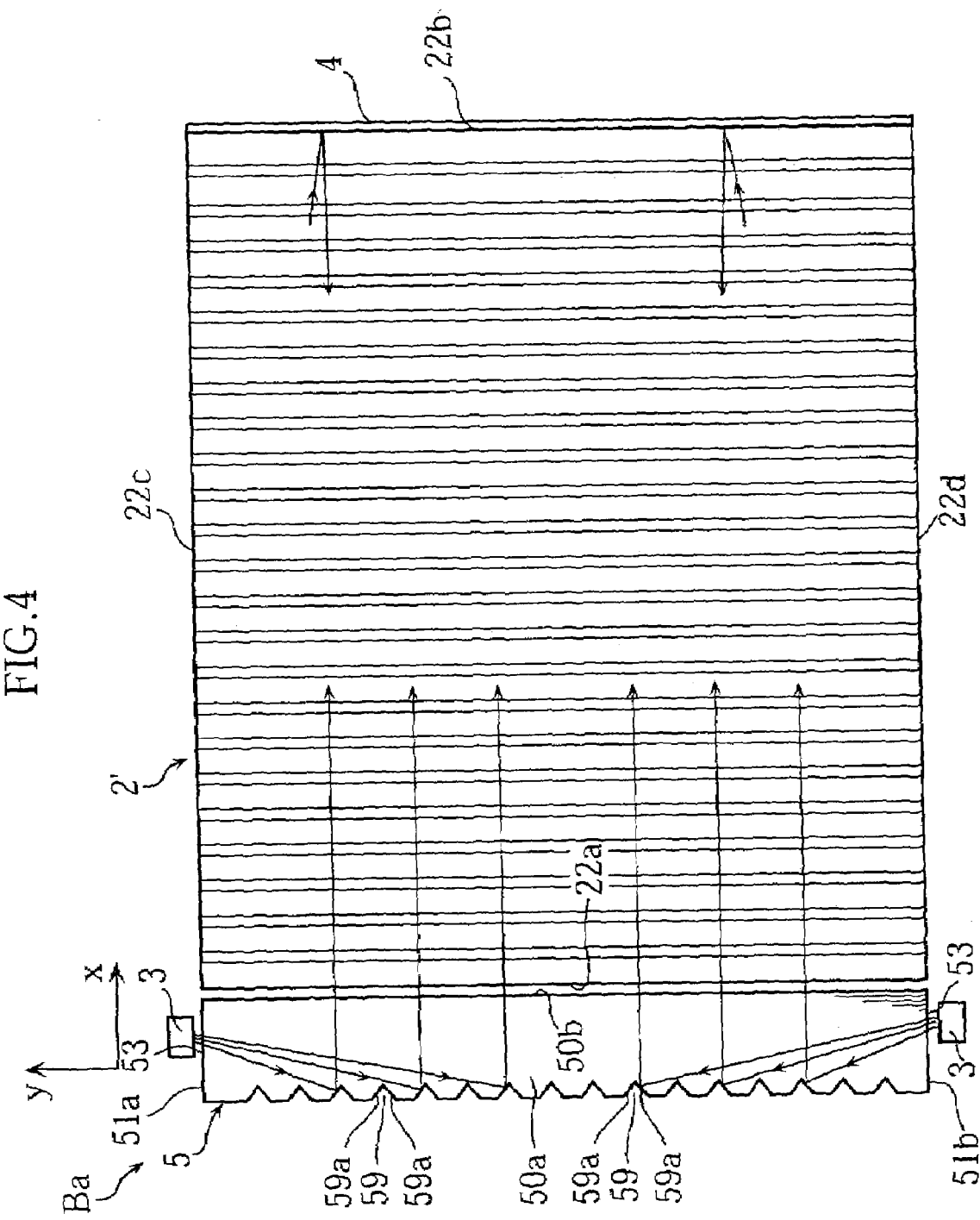
FIG. 4 is a plan view illustrating the lighting unit shown in FIG. 3.

FIGS. 3 and 4 illustrate a liquid crystal display comprising a lighting unit Ba according to a second embodiment of the present invention. A liquid crystal panel 1 shown in the figures is the same as that of the first embodiment.

The lighting unit Ba has a main light guiding member 2' and an auxiliary light guiding member 5 separate from the main light guiding member. The main guiding member 2' includes a front surface 20a formed with a plurality of protrusions. The protrusions have a structure and a function that are the same as those shown in FIG. 1. The main light guiding member 2' includes a flat rear surface 20b facing the liquid crystal panel 1. Further, as shown in FIG. 4, the main light guiding member 2' has first~fourth side surfaces 22a~22d. All of these side surfaces are flat. The second side surface 22b is covered with a reflecting layer 4 as in the first embodiment.

The auxiliary light guiding member 5 is made of transparent resin which is the same material as the main light guiding member 2', and includes a light reflecting surface 50a and a light outlet surface 50b that extend in the direction y, and a pair of side surfaces 51a and 51b that are respectively joined with these surfaces in cross relation. Each surface of the auxiliary light guiding member 5 is a mirror surface capable of totally reflecting light under specific conditions as in the main light guiding member 2. In part of each paired side surface 51a, 51b, there is provided with a light incidence surface 53 facing the light source 3. The light reflecting surface 50a is parabolic, having an axis which is a thicknesswise central line C of the auxiliary light guiding member 5, curved so that the thickness of the auxiliary light guiding member 5 are reduced as away from the light outlet surface 50b. At an opposite side to the light outlet surface 50b in the light reflecting surface 50a, there are formed with a plurality of recesses 59 each including a pair of V-shaped wall surfaces 59a and spaced appropriately from each other in the direction y, as in the recesses 29 shown in FIG. 2. As shown in FIG. 3, the auxiliary light guiding member 5 is covered with a suitable reflector 60 for reducing leakage of light (not shown in FIG. 4). The light outlet surface 50b faces in proximity to the first side surface 22a of the main light guiding member 2.

In the above-described structure, light entering into the auxiliary light guiding member 5 from the light source 3 is reflected by the light reflecting surface 50a to be emitted from the light outlet surface 50b, and is subsequently incident on the first side surface 22a of the main light guiding member 2' Since the light reflecting surface 50a of the auxiliary light guiding member 5 is parabolic, the light emitted from the light outlet surface 50b of the auxiliary light guiding member 5 can be prevented from being widely dispersed in the thickness direction of the main light guiding member 2. As a result, light entering into the main light guiding member 2 is rarely emitted from the front surface 20a and the rear surface 20b right after incidence, which contributes improvement of illumination efficiency.

In the embodiment above described, the main light guiding member and the auxiliary light guiding member are separately provided. However, the present invention is not limited to this, and the main light guiding member and the auxiliary light guiding member may be formed undividedly.

FIGS. 5A~6B show a lighting unit according to a third embodiment of the present invention. The lighting unit also comprises a main light guiding member 2" and an auxiliary light guiding member 5", as in the second embodiment. The main light guiding member 2" is the same as the main light guiding member 2' of the second embodiment. As seen from comparing FIG. 5A and FIG. 3 (or FIG. 6A and FIG. 4), the auxiliary light guiding member 5" is similar in shape to the auxiliary light guiding member 5 of the second embodiment. However, they differ in some respects as will be understood from the following description.

Figure 5A:
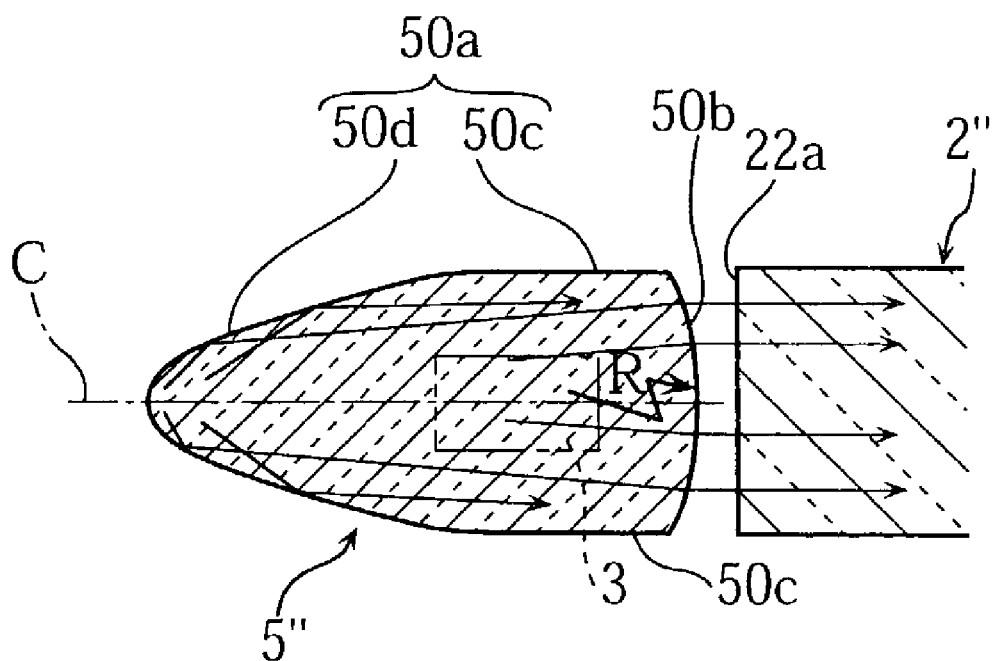
FIGS. 5A~6B show a lighting unit according to a third embodiment of the present invention.

As shown in FIG. 5A, the auxiliary light guiding member 5" has a light reflecting surface 50a provided with two flat portions 50c and one curved portion 50d. The flat portions 50c are spaced apart from each other in the thickness direction of the auxiliary light guiding member 5". The curved portion 50d joins these flat portions 50c, and has a thickness which is reduced as away from the main light guiding member 2". Preferably, the curved portion 50d is parabolic. The light reflecting surface 50a is symmetrical about a central line C.

Figure 5B:
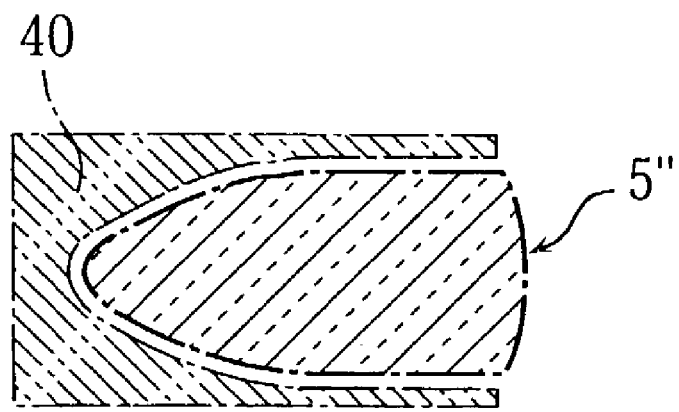

The auxiliary light guiding member 5" includes a curved light outlet surface 50b. In the illustrated embodiment, the light outlet surface 50b has a predetermined radius of curvature R. With such a non-flat light outlet surface 50b, light emitted from the auxiliary light guiding member 5" can efficiently enter into the main light guiding member 2". Preferably as shown in FIG. 5B, the auxiliary light guiding member 5" is covered with a highly reflective reflector 40. With this arrangement, the light emitted from the light source 3 can enter into the main light guiding member 2" more efficiently.

Figure 6A:
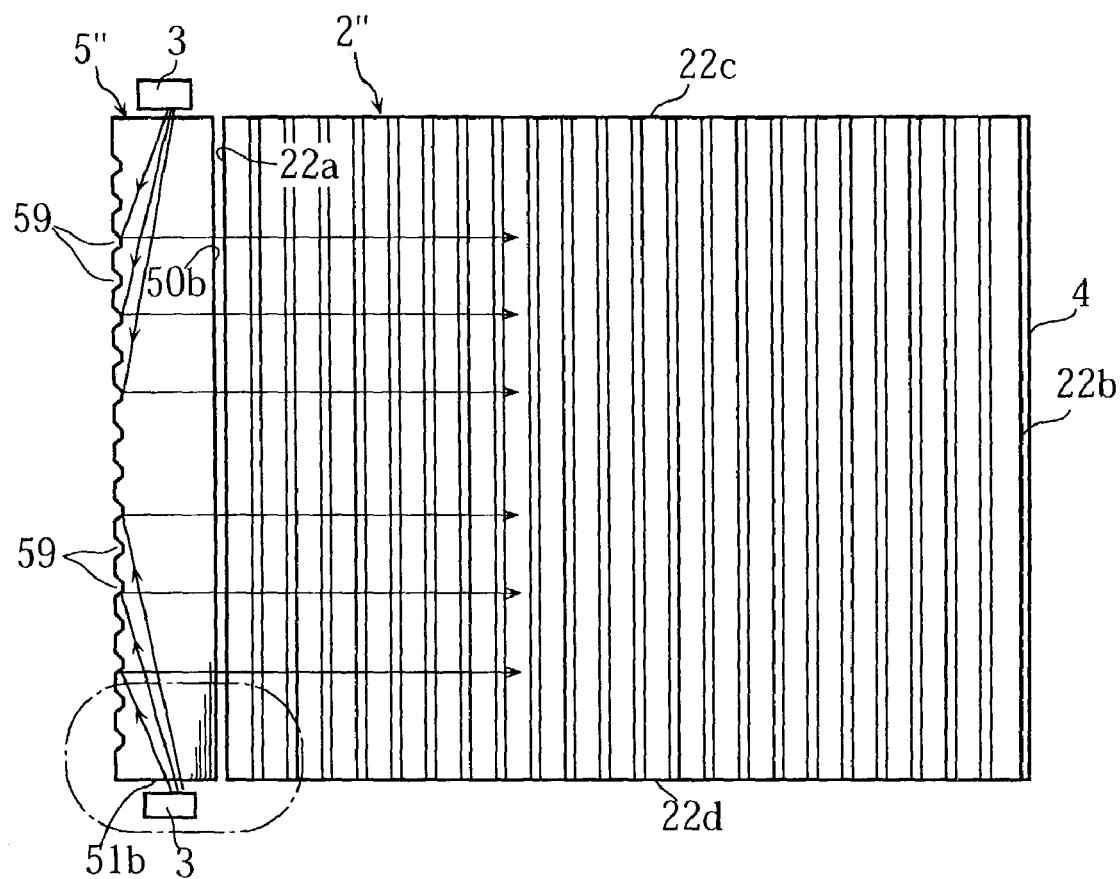
Figure 6B:
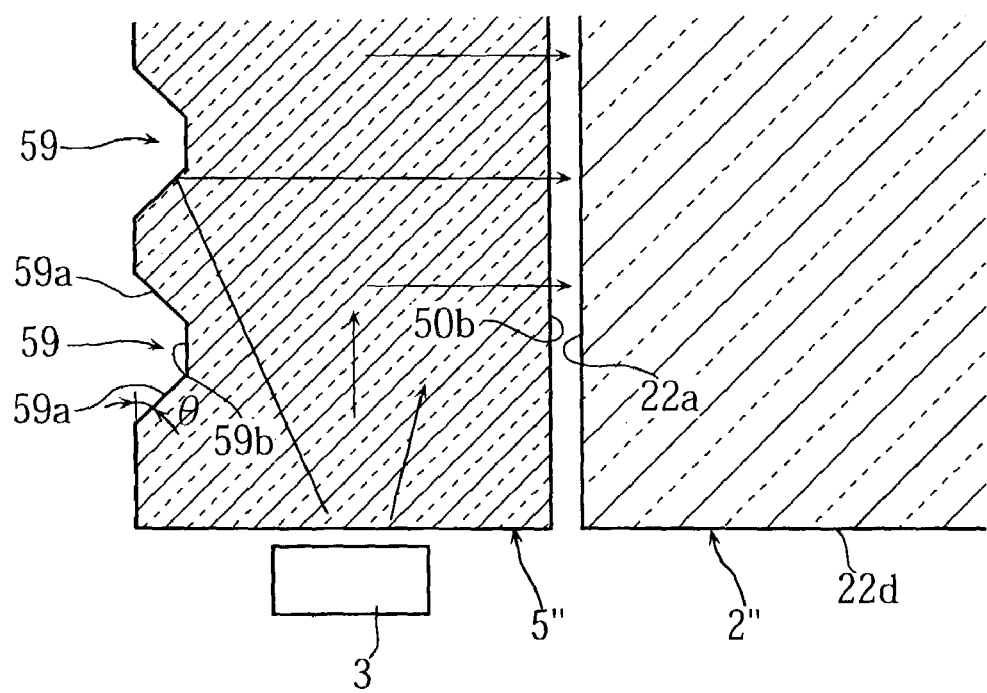
Figure 7A:
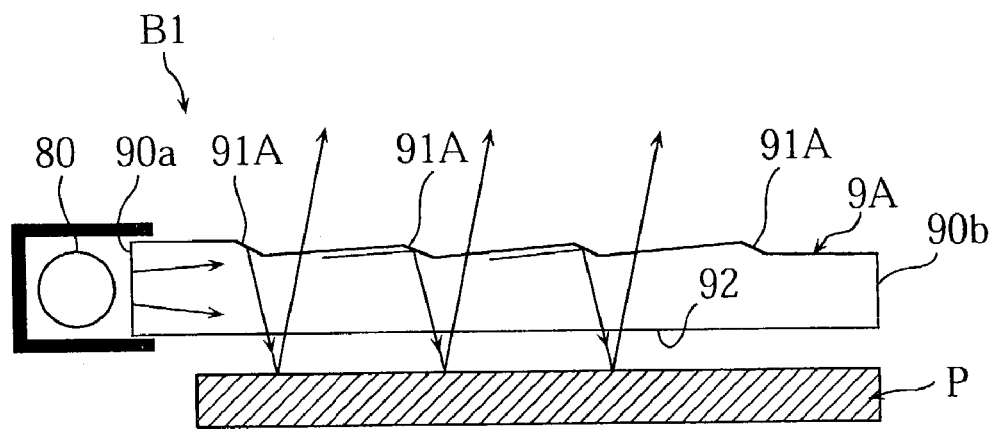
FIG. 7A shows a conventional lighting unit.
Figure 7B:
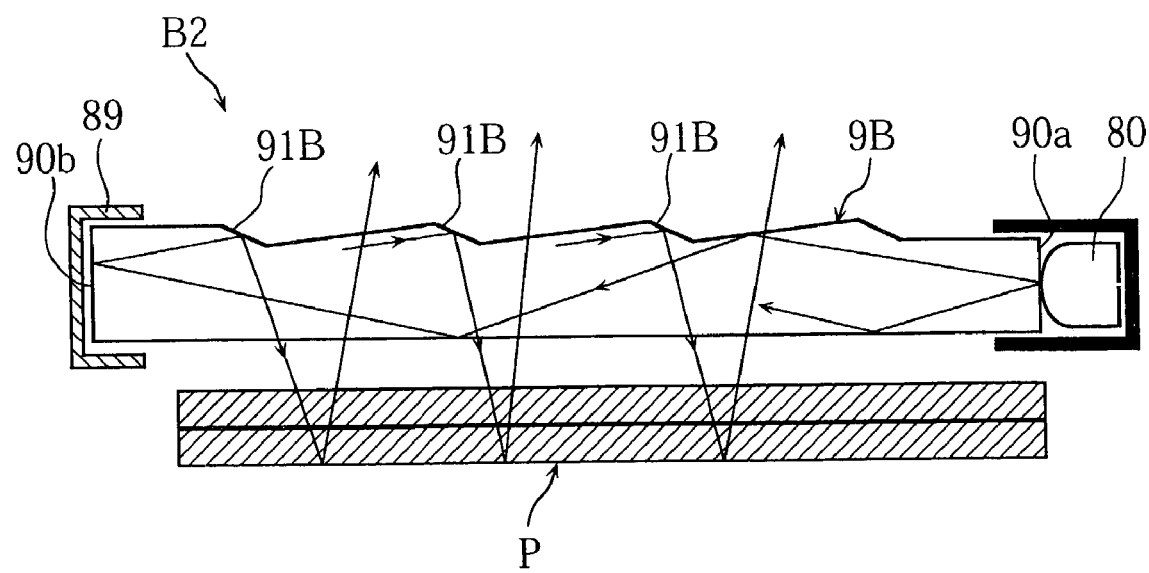
FIG. 7B shows a conventional lighting unit of different type.

As shown in FIG. 6A, the auxiliary light guiding member 5" is formed with a plurality of recesses 59. Each cutout 59, as shown in FIG. 6B, has a pair of slant wall surfaces 59a and a flat surface 59b joining them. Each slant wall surface 59a has an inclination angle • set so as to receive the light emitted from the light source 3 and subsequently to suitably reflect it toward the main light guiding member 2". The flat surface 59b is parallel to the first side surface 22a and to the second side surface 22b.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A lighting unit comprising:
a light guide including a rear surface facing an object to be illuminated, a front surface opposite to the rear surface, a first side surface extending between the rear surface and the front surface, and a second side surface spaced from the first side surface;
a lighting source adjacent to the light guide for supplying light to be directed from the first side surface toward the second side surface; and
a reflector for reflecting light incident on the second side surface toward the first side surface;
wherein the front surface of the light guide is formed with first slant portions and second slant portions, the first slant portions reflecting the light, traveling from the first side surface toward the second side surface, toward the rear surface of the light guide, the second slant portions reflecting the light, traveling from the second side surface toward the first side surface, toward the rear surface of the light guide,
wherein the front surface of the light guide is also formed with flat portions and flat regions, said flat portions and said flat regions being parallel to the rear surface of the light guide and arranged to alternate with each other in a direction proceeding from the first side surface toward the second side surface of the light guide, each of said flat portions extending between paired first and second slant portions and cooperating with these slant portions to define a protrusion in the front surface of the light guide, each of said flat regions extending between paired first and second slant portions and cooperating with these slant portions to define a groove in the front surface of the light guide, said flat regions being closer to the rear surface of the light guide than said flat portions are,
wherein the front surface of the light guide includes a preliminary flat region which is adjacent to the first side surface of the light guide and parallel to the rear surface of the light guide, the preliminary flat region being closer to the first side surface than any one of the first and the second slant portions, the preliminary flat region being closer to the rear surface of the light guide than any one of said flat portions in the front surface of the light guide,
wherein the first side surface of the light guide is parabolic and convex away from the second side surface, light emitted from the light source being reflected by the first side surface toward the second side surface.

2. The lighting unit according to claim 1, wherein the reflector covers the second side surface.

3. The lighting unit according to claim 1, wherein each of the first slant portions and a corresponding one of the second slant portions are spaced from each other and held non-parallel to each other.

4. The lighting unit according to claim 1, wherein one of the first slant portions is closer to the second side surface than another of the first slant portions is, said one of the first slant portions having a greater height than said another of the first slant portions.

5. The lighting unit according to claim 1, wherein the light guide comprises a third side surface extending between the first side surface and the second side surface, the light source facing the third side surface.

6. The lighting unit according to claim 1, wherein the light guide comprises an auxiliary light guiding member facing the light source, a main light guiding member separated from the auxiliary light guiding member, the first side surface being provided on the auxiliary light guiding member, the second side surface being provided on the main light guiding member.

7. The lighting unit according to claim 6, wherein the auxiliary light guiding member comprises a light outlet surface for emitting light reflected by the first side surface, the main light guiding member comprising a light incidence surface facing the light outlet surface.

8. The lighting unit according to claim 7, wherein the light outlet surface is convex toward the light incidence surface.

9. The lighting unit according to claim 1, wherein the first side surface is formed with a plurality of recesses for reflecting light emitted from the light source toward the second side surface, each recess including a pair of slant wall surfaces non-parallel to each other, and a flat portion extending between the slant wall surfaces.

10. The lighting unit according to claim 9, wherein the flat portion is parallel to the second side surface.

11. The lighting unit according to claim 1, wherein the light guide comprises a third side surface extending between the first side surface and the second side surface, the light source facing the third side surface, and wherein the light source comprises a light-emitting area having a width and a length, the width of the light-emitting area being smaller than a distance between the preliminary flat region and the rear surface of the light guide, the length of the light-emitting area being smaller than a length of the preliminary flat region measured in the direction proceeding from the first side surface toward the second side surface of the light guide.

* * * * *